(12) United States Patent
Liu et al.

(10) Patent No.: US 10,078,169 B2
(45) Date of Patent: Sep. 18, 2018

(54) QUANTUM TUBE, BACKLIGHT MODULE AND LIQUID CRYSTAL DISPLAY DEVICE

(71) Applicants: HannStar Display (Nanjing) Corporation, Nanjing, Jiangsu Province (CN); HANNSTAR DISPLAY CORPORATION, Taipei (TW)

(72) Inventors: Chun-Pin Liu, Taipei (TW); Chin-Wei Lin, Tainan (TW)

(73) Assignees: HannStar Display (Nanjing) Corporation, Nanjing, Jiangsu Province (CN); HANNSTAR DISPLAY CORPORATION, Taipei (TW)

( * ) Notice: Subject to any disclaimer, the term of this patent is extended or adjusted under 35 U.S.C. 154(b) by 121 days.

(21) Appl. No.: 15/057,128

(22) Filed: Mar. 1, 2016

(65) Prior Publication Data
US 2016/0259110 A1  Sep. 8, 2016

(30) Foreign Application Priority Data

Mar. 2, 2015 (CN) .......................... 2015 1 0092882

(51) Int. Cl.
*G02F 1/1335* (2006.01)
*F21V 8/00* (2006.01)

(52) U.S. Cl.
CPC ......... *G02B 6/0023* (2013.01); *G02B 6/0025* (2013.01)

(58) Field of Classification Search
None
See application file for complete search history.

(56) References Cited

U.S. PATENT DOCUMENTS

| 7,637,646 | B2 | 12/2009 | Byun |
| 9,429,698 | B2* | 8/2016 | Lee ..................... G02B 6/0026 |
| 2009/0213296 | A1* | 8/2009 | Park .................. G02F 1/133603 349/62 |
| 2010/0328580 | A1 | 12/2010 | Kim |
| 2012/0113354 | A1* | 5/2012 | Park .................. G02F 1/133606 349/62 |
| 2013/0083271 | A1 | 4/2013 | Tsai |
| 2014/0126238 | A1 | 5/2014 | Kao |

(Continued)

FOREIGN PATENT DOCUMENTS

| CN | 1510484 A | 7/2004 |
| CN | 101097349 A | 1/2008 |

(Continued)

*Primary Examiner* — Edward Glick
*Assistant Examiner* — David Chung
(74) *Attorney, Agent, or Firm* — Winston Hsu

(57) ABSTRACT

A quantum tube includes a tube body, a plurality of first fluorescent particles and a plurality of second fluorescent particles. The tube body has a light incident surface, a light emitting surface, a top surface and a bottom surface. The top surface is connected between the light incident surface and the light emitting surface. The bottom surface is connected between the light incident surface and the light emitting surface. The top surface is opposite to the bottom surface. The top surface has an inclined portion. The inclined portion inclines with respect to the bottom surface by an angle. The first fluorescent particles are disposed in the tube body. The second fluorescent particles are disposed in the tube body.

11 Claims, 5 Drawing Sheets

(56) References Cited

U.S. PATENT DOCUMENTS

| | | | | |
|---|---|---|---|---|
| 2014/0158982 A1* | 6/2014 | Park | ................ | G02B 6/005 |
| | | | | 257/13 |
| 2014/0168571 A1* | 6/2014 | Hyun | ............... | G02F 1/133615 |
| | | | | 349/61 |
| 2015/0055372 A1 | 2/2015 | Wu | | |
| 2015/0311385 A1* | 10/2015 | Qiu | ................ | G02F 1/133606 |
| | | | | 257/13 |
| 2016/0062024 A1* | 3/2016 | Lee | ................ | G02B 6/0065 |
| | | | | 349/65 |

FOREIGN PATENT DOCUMENTS

| | | |
|---|---|---|
| CN | 201652190 U | 11/2010 |
| CN | 101930137 A | 12/2010 |
| CN | 102393580 A | 3/2012 |
| CN | 103792729 A | 5/2014 |
| CN | 103807664 A | 5/2014 |
| CN | 104181627 A | 12/2014 |
| JP | 2006-253019 A | 9/2006 |
| JP | 2010-261048 A | 11/2010 |

\* cited by examiner

QUANTUM TUBE, BACKLIGHT MODULE AND LIQUID CRYSTAL DISPLAY DEVICE

BACKGROUND OF THE INVENTION

1. Field of the Invention

The invention relates to a quantum tube and, more particularly, to a quantum tube having an inclined portion, a backlight module equipped with the quantum tube, and a liquid crystal display device equipped with the backlight module.

2. Description of the Prior Art

How to improve environmental protection (e.g. do not use color filter) and display quality (e.g. Motion Picture Response Time (MPRT)) is a significant issue for a liquid crystal display device. If a high-speed liquid crystal can be used in the liquid crystal display device, the environmental protection and display quality can be improved. A blue phase liquid crystal is a liquid crystal with high-speed reaction, whose rising time and falling time are within one millisecond. The high-speed liquid crystal can improve serious motion blur for the liquid crystal display device. A field sequential color (FSC) method is a display technology without using a color filter, such that it can increase transmittance of the display panel. However, it has to cooperate with high-speed liquid crystal, so as to enhance light-up time of the backlight module and reduce complexity of the driving manner.

Referring to FIGS. 1 and 2, FIG. 1 is a schematic top view illustrating a backlight module 10 of the prior art and FIG. 2 is a schematic sectional view illustrating a liquid crystal display device 1 equipped with the backlight module 10 shown in FIG. 1. As shown in FIG. 2, the liquid crystal display device 1 comprises a backlight module 10 and a liquid crystal display panel 12, wherein the liquid crystal display panel 12 is disposed on the backlight module 10. The liquid crystal display panel 12 has a liquid crystal 124 and a thin film transistor (TFT) driving circuit 126 located between an upper substrate 120 and a lower substrate 122. Furthermore, the liquid crystal display panel 12 may further has a touch sensing circuit 128 formed on the upper substrate 120, so as to achieve touch function.

As shown in FIGS. 1 and 2, the backlight module 10 comprises a light guide plate 100, a plurality of red light sources 102R, a plurality of green light sources 102G, a plurality of blue light sources 102B, a reflective sheet 104 and an optical film assembly 106. In practical applications, the light guide plate 100 may have dot patterns or other interference structures formed thereon, such that the light emitted by the red light sources 102R, the green light sources 102G and the blue light sources 102B into the light guide plate 100 can be diffused uniformly towards the liquid crystal display panel 12. The reflective sheet 104 can reflect partial stray light, so as to enhance the light emitting efficiency. Moreover, the optical film assembly 106 disposed on the light guide plate 100 is used for improving optical characteristic of the light, wherein the optical film assembly 106 may comprise a prism sheet, a diffusing sheet and so on according to practical applications.

The prior art arranges the red light sources 102R, the green light sources 102G and the blue light sources 102B interlacedly along an edge of the light guide plate 100 and uses the field sequential color method to drive the red light sources 102R, the green light sources 102G and the blue light sources 102B to emit light towards the high speed response liquid crystal 124. However, since the light emitting efficiency and lifespan of the red light sources 102R, the green light sources 102G and the blue light sources 102B are different from each other, the display quality and lifespan of the liquid crystal display device 1 are influenced accordingly.

SUMMARY OF THE INVENTION

The invention provides a quantum tube, a backlight module and a liquid crystal display device, so as to solve the aforesaid problems.

According to an embodiment of the invention, a quantum tube comprises a tube body, a plurality of first fluorescent particles and a plurality of second fluorescent particles. The tube body has a light incident surface, a light emitting surface, a top surface and a bottom surface. The top surface is connected between the light incident surface and the light emitting surface. The bottom surface is connected between the light incident surface and the light emitting surface. The top surface is opposite to the bottom surface. The top surface has an inclined portion. The inclined portion inclines with respect to the bottom surface by an angle. The first fluorescent particles are disposed in the tube body. The second fluorescent particles are disposed in the tube body.

Preferably, the angle is between 2 degrees and 10 degrees.

Preferably, the inclined portion is a flat surface or an arc-shaped surface.

Preferably, the top surface further has a horizontal portion, the horizontal portion is connected between the light incident surface and the inclined portion, the inclined portion is connected between the horizontal portion and the light emitting surface, and the horizontal portion is parallel to the bottom surface.

Preferably, the light incident surface is a flat surface and the light emitting surface is an arc-shaped surface.

Preferably, the tube body further has a plurality of first partitions, a plurality of second partitions and a plurality of third partitions arranged interlacedly, the first fluorescent particles are disposed in the first partitions, and the second fluorescent particles are disposed in the second partitions.

Preferably, the first fluorescent particles and the second fluorescent particles are mixed with each other.

Preferably, the quantum tube further comprises a reflective layer disposed on the top surface.

Preferably, the quantum tube further comprises a diffusing structure disposed on the light emitting surface.

According to another embodiment of the invention, a backlight module comprises a light guide plate, a plurality of light sources and the aforesaid quantum tube. The quantum tube is disposed between the light guide plate and the light sources. The light sources are adjacent to the light incident surface. The light guide plate is adjacent to the light emitting surface. The inclined portion inclines downwardly from the light sources towards the light guide plate.

According to another embodiment of the invention, a liquid crystal display device comprises the aforesaid backlight module and a liquid crystal display panel. The liquid crystal display panel is disposed on the backlight module.

Preferably, the liquid crystal display panel is a blue phase liquid crystal display panel.

As mentioned in the above, the invention disposes the quantum tube with the inclined portion between the light guide plate and the light sources and disposes the first fluorescent particles and the second fluorescent particles in the quantum tube. Therefore, the light sources may emit identical first color light (e.g. blue light). Then, the first fluorescent particles convert the first color light (e.g. blue light) into a second color light (e.g. red light) and the second fluorescent particles convert the first color light (e.g. blue light) into a third color light (e.g. green light). Accordingly, the invention can ensure that the light emitting efficiency and lifespan of the light sources of the backlight module are uniform. Furthermore, since the first fluorescent particles and the second fluorescent particles are disposed in the quantum tube, they do not contact the light sources directly, such that the invention can prevent luminous decay from occurring on the first fluorescent particles and the second fluorescent particles due to high heat generated by the light sources. Moreover, in a thin type liquid crystal display device, the thickness of the light guide plate of the backlight module is usually thin. The inclined portion of the top surface of the quantum tube can guide the light emitted by the light sources to the light emitting surface effectively, so as to enhance light utilization rate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
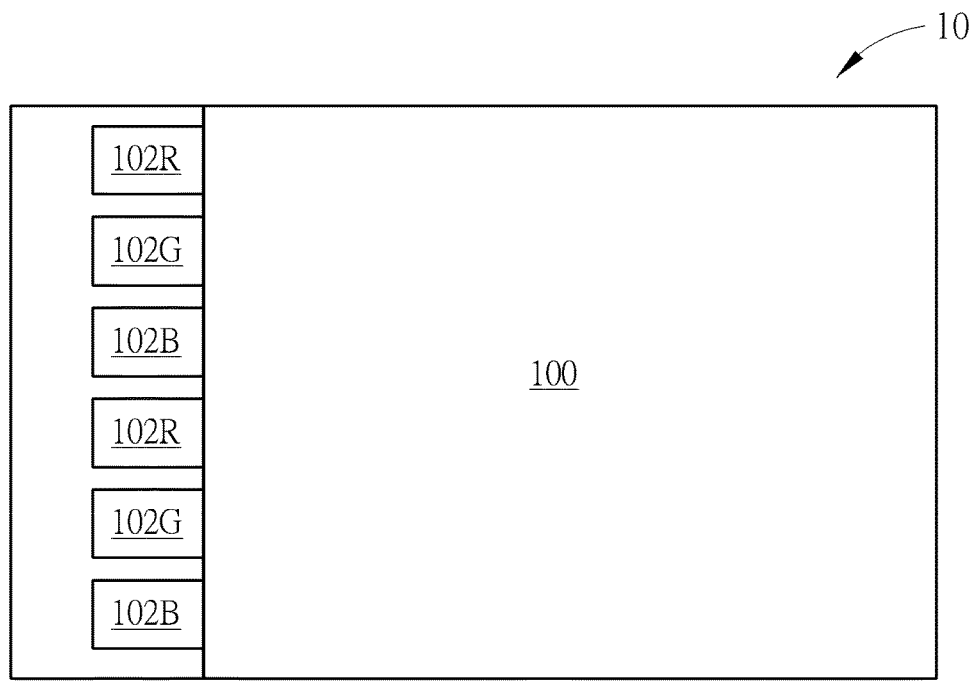
FIG. 1 is a schematic top view illustrating a backlight module of the prior art.
Figure 2:
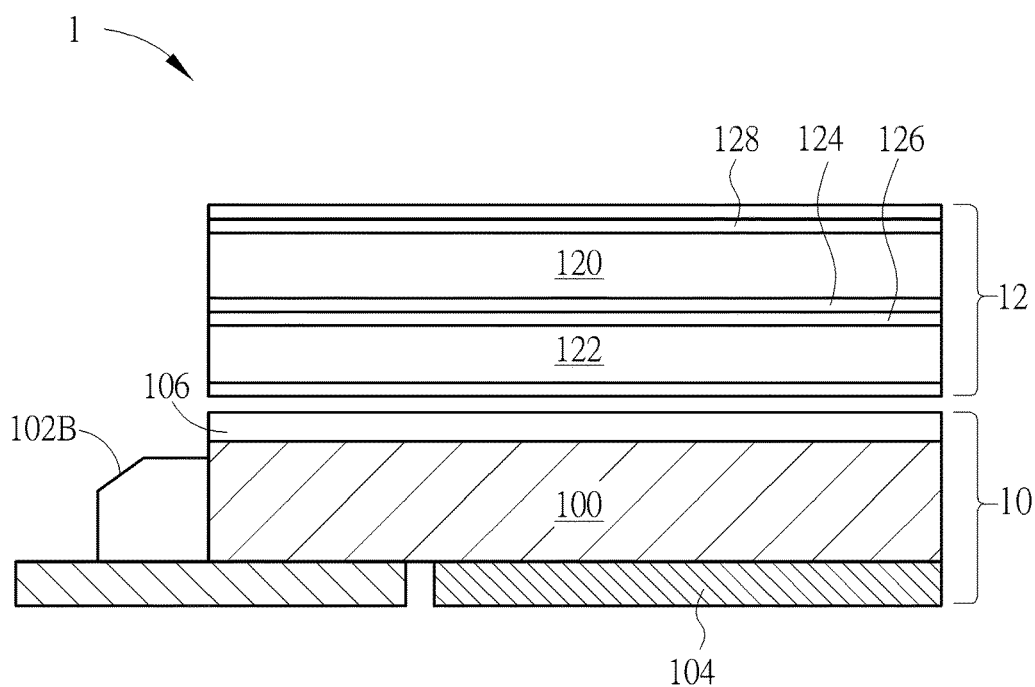
FIG. 2 is a schematic sectional view illustrating a liquid crystal display device equipped with the backlight module shown in FIG. 1.
Figure 3:
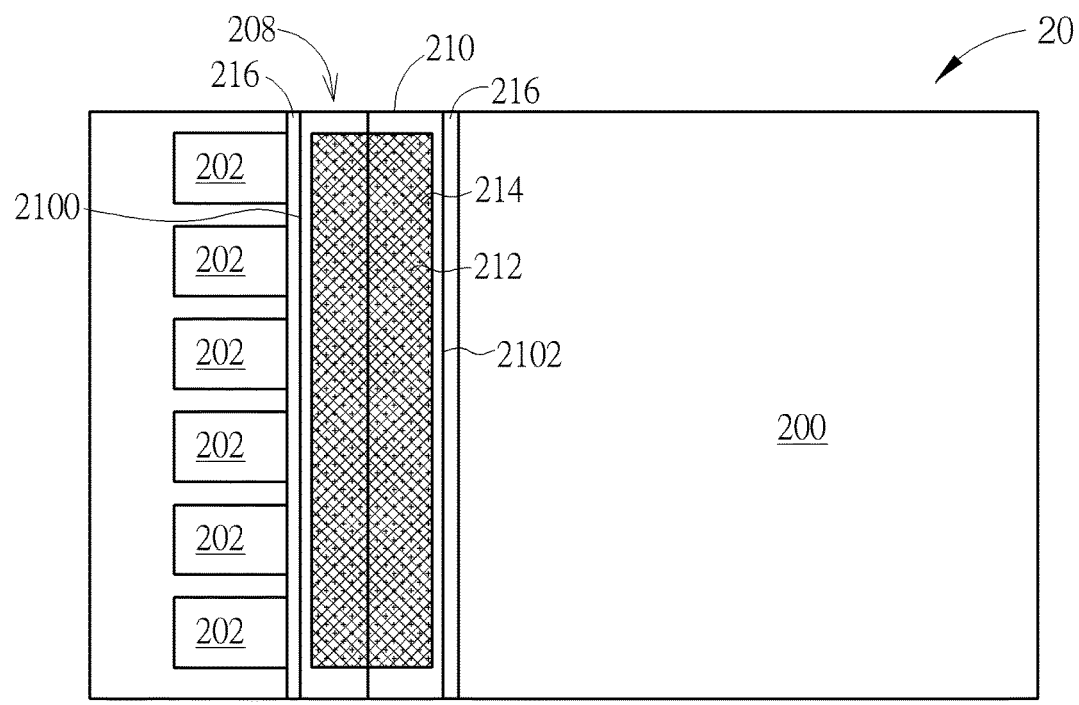
FIG. 3 is a schematic top view illustrating a backlight module according to a first embodiment of the invention.
Figure 4:
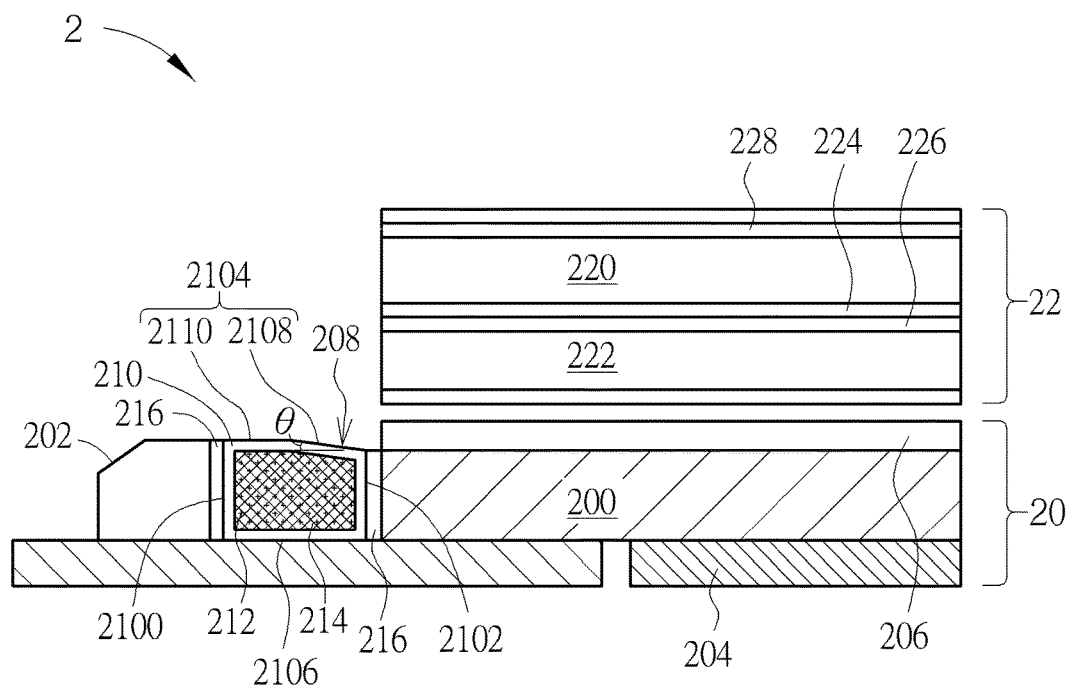
FIG. 4 is a schematic sectional view illustrating a liquid crystal display device equipped with the backlight module shown in FIG. 3.

Referring to FIGS. 3 and 4, FIG. 3 is a schematic top view illustrating a backlight module 20 according to a first embodiment of the invention and FIG. 4 is a schematic sectional view illustrating a liquid crystal display device 2 equipped with the backlight module 20 shown in FIG. 3. As shown in FIG. 4, the liquid crystal display device 2 comprises a backlight module 20 and a liquid crystal display panel 22, wherein the liquid crystal display panel 22 is disposed on the backlight module 20. In this embodiment, the liquid crystal display panel 22 may have a liquid crystal 224 and a thin film transistor (TFT) driving circuit 226 located between an upper substrate 220 and a lower substrate 222. Furthermore, the liquid crystal display panel 22 may further has a touch sensing circuit 228 formed on the upper substrate 220, so as to achieve touch function.

As shown in FIGS. 3 and 4, the backlight module 20 comprises a light guide plate 200, a plurality of light sources 202, a reflective sheet 204, an optical film assembly 206 and a quantum tube 208. In practical applications, the light guide plate 200 may have dot patterns or other interference structures formed thereon, such that the light emitted by the light sources 202 into the light guide plate 200 can be diffused uniformly towards the liquid crystal display panel 22. The reflective sheet 204 can reflect partial stray light, so as to enhance the light emitting efficiency. Moreover, the optical film assembly 206 disposed on the light guide plate 200 is used for improving optical characteristic of the light, wherein the optical film assembly 206 may comprise a prism sheet, a diffusing sheet and so on according to practical applications.

As shown in FIG. 3, the quantum tube 208 comprises a tube body 210, a plurality of first fluorescent particles 212 and a plurality of second fluorescent particles 214. In this embodiment, the first fluorescent particles 212 and the second fluorescent particles 214 are mixed with each other and disposed in the tube body 210. As shown in FIG. 4, the tube body 210 has a light incident surface 2100, a light emitting surface 2102, a top surface 2104 and a bottom surface 2106, wherein the top surface 2104 is connected between the light incident surface 2100 and the light emitting surface 2102, the bottom surface 2106 is connected between the light incident surface 2100 and the light emitting surface 2102, the top surface 2104 is opposite to the bottom surface 2106, the top surface 2104 has an inclined portion 2108, and the inclined portion 2108 inclines with respect to the bottom surface 2106 by an angle θ. In this embodiment, the top surface 2104 may further have a horizontal portion 2110, wherein the horizontal portion 2110 is connected between the light incident surface 2100 and the inclined portion 2108, the inclined portion 2108 is connected between the horizontal portion 2110 and the light emitting surface 2102, and the horizontal portion 2110 is parallel to the bottom surface 2106. In this embodiment, the inclined portion 2108 is a flat surface. However, in another embodiment, the inclined portion 2108 may also be a convex arc-shaped surface.

The quantum tube 208 is disposed between the light guide plate 200 and the light sources 202, wherein the light sources 202 are adjacent to the light incident surface 2100 of the tube body 210, the light guide plate 200 is adjacent to the light emitting surface 2102 of the tube body 210, and the inclined portion 2108 inclines downwardly from the light sources 202 towards the light guide plate 200. In this embodiment, the quantum tube 208 may be attached on the light guide plate 200 by an optical clear adhesive 216 or the like. Furthermore, the light sources 202 may also be attached on the other side of the quantum tube 208 by the optical clear adhesive 216 or the like.

In this embodiment, the light sources 202 may emit a first color light, the first fluorescent particles 212 may convert the first color light into a second color light, and the second fluorescent particles 214 may convert the first color light into a third color light. For example, the light sources 202 may be blue light emitting diodes, so the first color light emitted by the light sources 202 may be blue light. At this time, the first fluorescent particles 212 may be fluorescent particles capable of converting blue light into red light (i.e. the second color light) and the second fluorescent particles 214 may be fluorescent particles capable of converting blue light into green light (i.e. the third color light). Still further, since the top surface 2104 of the quantum tube 208 has the inclined portion 2108, the inclined portion 2108 can guide the light emitted by the light sources 202 to the light emitting surface 2102 effectively, so as to enhance light utilization rate. Preferably, the angle θ included between the inclined portion 2108 and the bottom surface 2106 may be between 2 degrees and 10 degrees, so as to optimize light utilization rate. It should be noted that when the liquid crystal display device 2 is a thin type liquid crystal display device, the thickness of the light guide plate 200 of the backlight module 20 is usually thin. The inclined portion 2108 of the top surface 2104 of the quantum tube 208 can guide the light emitted by the light sources 202 to the light emitting surface 2102 effectively, so as to enhance light utilization rate. In other words, the quantum tube 208 with the inclined portion 2108 of the invention is very suitable for the thin type liquid crystal display device.

Figure 5:
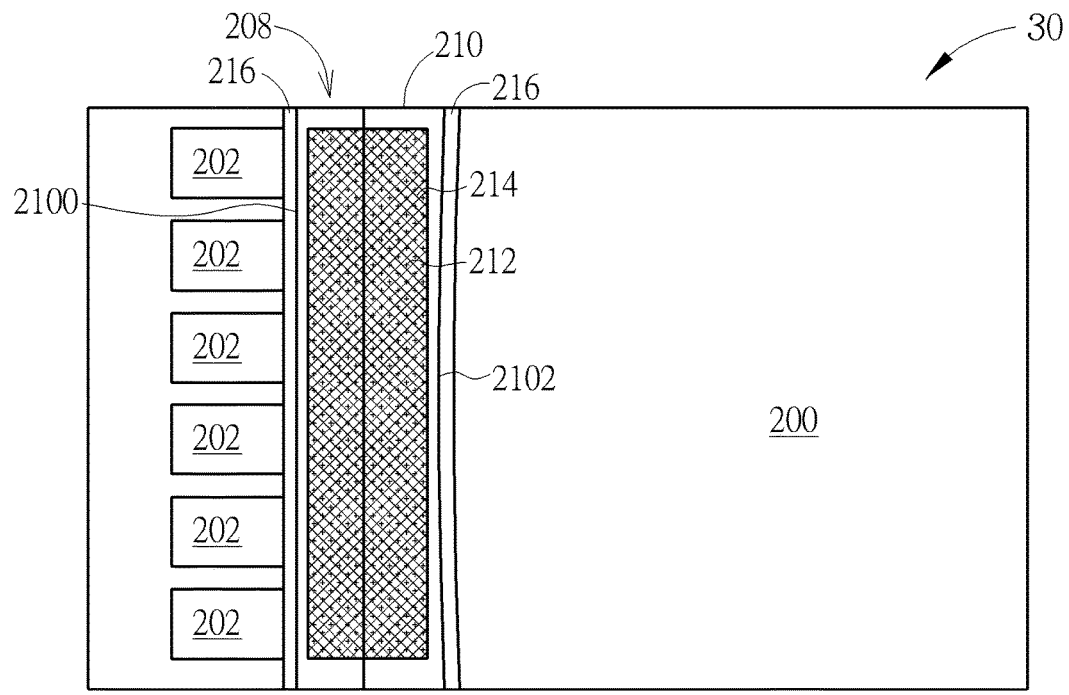
FIG. 5 is a schematic top view illustrating a backlight module according to a second embodiment of the invention.

Referring to FIG. 5, FIG. 5 is a schematic top view illustrating a backlight module 30 according to a second embodiment of the invention. The main difference between the backlight module 30 and the aforesaid backlight module 20 is that, in the backlight module 30, the light incident surface 2100 of the quantum tube 208 is a flat surface and the light emitting surface 2102 of the quantum tube 208 is a concave arc-shaped surface. In this embodiment, when the light emitted by the light sources 202 passes through the light emitting surface 2102, which is formed as concave arc-shaped surface, and enters the light guide plate 200, the light will be concentrated inwardly, so as to enhance central luminance of the backlight module 30 effectively.

Figure 6:
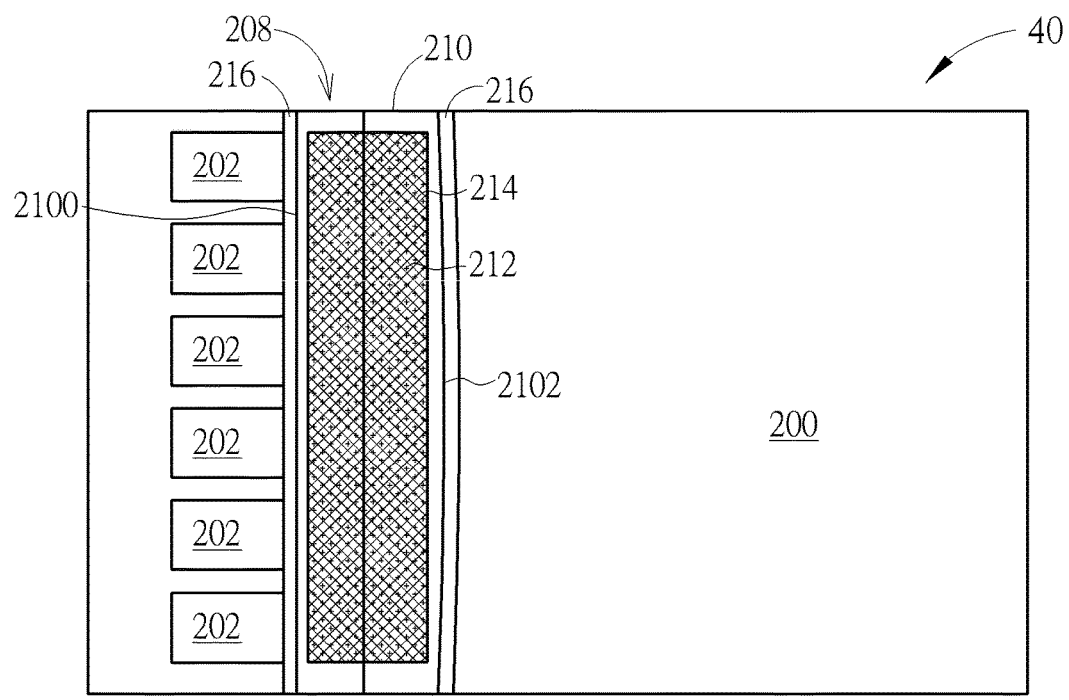
FIG. 6 is a schematic top view illustrating a backlight module according to a third embodiment of the invention.

Referring to FIG. 6, FIG. 6 is a schematic top view illustrating a backlight module 40 according to a third embodiment of the invention. The main difference between the backlight module 40 and the aforesaid backlight module 20 is that, in the backlight module 40, the light incident surface 2100 of the quantum tube 208 is a flat surface and the light emitting surface 2102 of the quantum tube 208 is a convex arc-shaped surface. In this embodiment, when the light emitted by the light sources 202 passes through the light emitting surface 2102, which is formed as convex arc-shaped surface, and enters the light guide plate 200, the light will be diffused outwardly, so as to make display quality of the liquid crystal display device more uniform.

Figure 7:
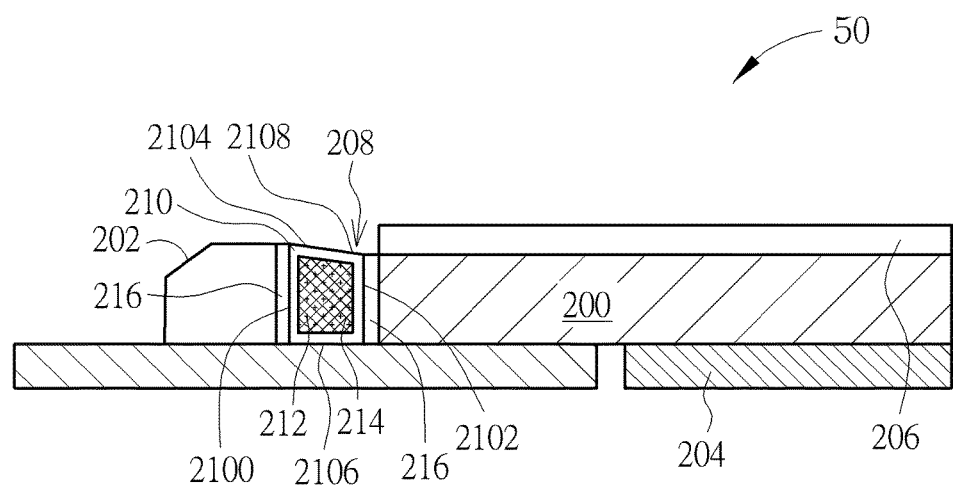
FIG. 7 is a schematic sectional view illustrating a backlight module according to a fourth embodiment of the invention.

Referring to FIG. 7, FIG. 7 is a schematic sectional view illustrating a backlight module 50 according to a fourth embodiment of the invention. The main difference between the backlight module 50 and the aforesaid backlight module 20 is that, in the backlight module 50, the top surface 2104 of the quantum tube 208 consists of one single inclined portion 2108 without the aforesaid horizontal portion 2110.

Figure 8:
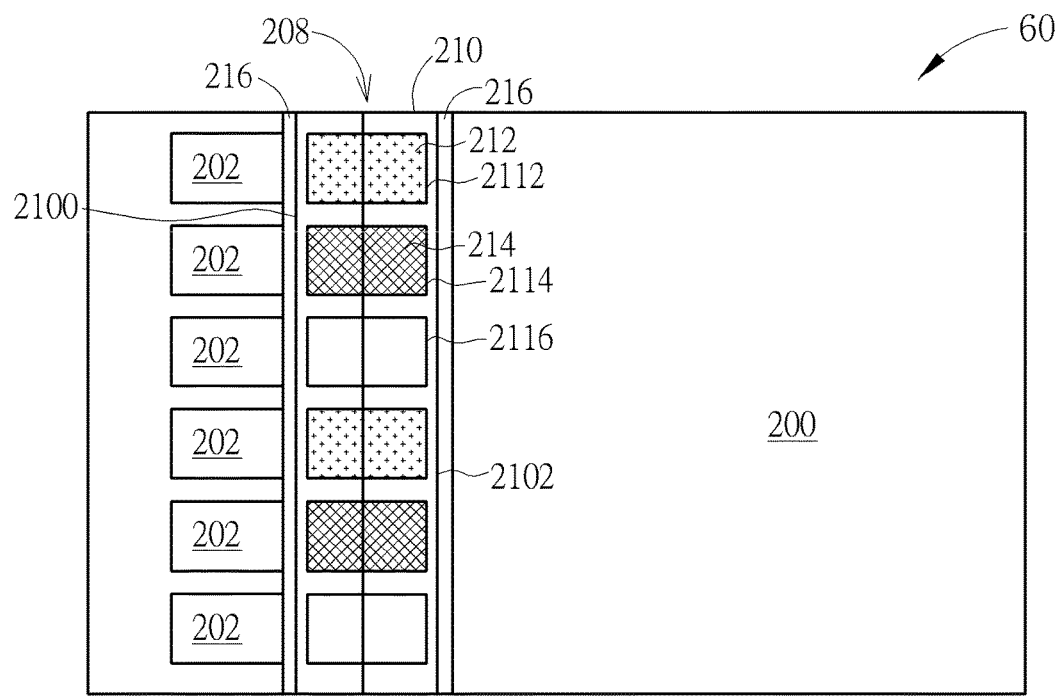
FIG. 8 is a schematic top view illustrating a backlight module according to a fifth embodiment of the invention.

Referring to FIG. 8, FIG. 8 is a schematic top view illustrating a backlight module 60 according to a fifth embodiment of the invention. The main difference between the backlight module 60 and the aforesaid backlight module 20 is that, in the backlight module 60, the tube body 210 of the quantum tube 208 further has a plurality of first partitions 2112, a plurality of second partitions 2114 and a plurality of third partitions 2116 arranged interlacedly, wherein the first fluorescent particles 212 are disposed in the first partitions 2112, the second fluorescent particles 214 are disposed in the second partitions 2114, and there are no fluorescent particles disposed in the third partitions 2116. For example, the light sources 202 may be blue light emitting diodes, so the first color light emitted by the light sources 202 may be blue light. At this time, the first fluorescent particles 212 may be fluorescent particles capable of converting blue light into red light (i.e. the second color light) and the second fluorescent particles 214 may be fluorescent particles capable of converting blue light into green light (i.e. the third color light). Accordingly, when the blue light emitted by the light sources 202 passes through the first partitions 2112, the second partitions 2114 and the third partitions 2116 of the quantum tube 208, red light, green light and blue light will be generated and then mixed uniformly by the light guide plate 200. When the liquid crystal of the liquid crystal display panel is blue phase liquid crystal, the backlight module 60 shown in FIG. 8 can be used to provide light.

When the liquid crystal display panel has blue phase liquid crystal, the liquid crystal display panel is a blue phase liquid crystal display panel and the liquid crystal display panel may be a field sequential color (FSC) liquid crystal display panel. A field sequential color (FSC) method is a display technology without using a color filter, such that it can increase transmittance of the display panel. However, it has to cooperate with high-speed liquid crystal, so as to enhance light-up time of the backlight module 60 and reduce complexity of the driving manner.

Figure 9:
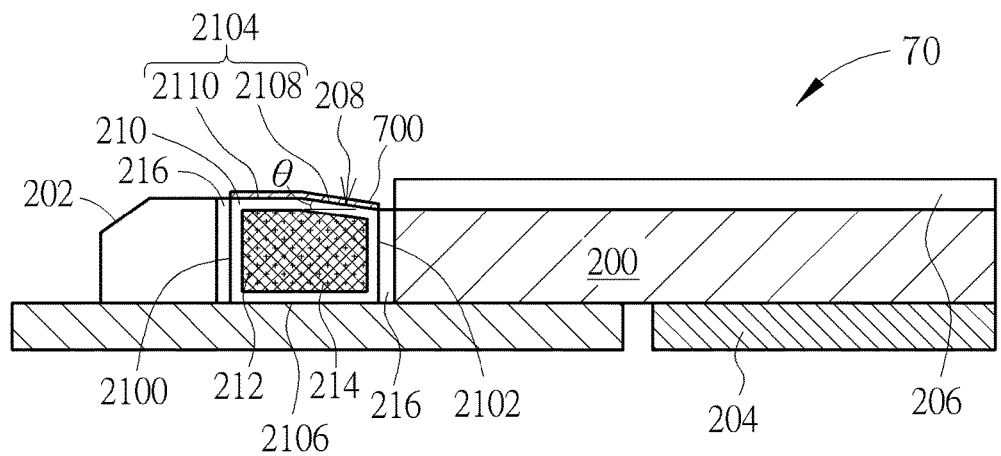
FIG. 9 is a schematic sectional view illustrating a backlight module according to a sixth embodiment of the invention.

Referring to FIG. 9, FIG. 9 is a schematic sectional view illustrating a backlight module 70 according to a sixth embodiment of the invention. The main difference between the backlight module 70 and the aforesaid backlight module 20 is that the quantum tube 208 of the backlight module 70 further comprises a reflective layer 700 disposed on the top surface 2104. In this embodiment, the reflective layer 700 may be made of silver, aluminum, white paint, or the like. The reflective layer 700 can reflect the light emitted by the light sources 202 to the light guide plate 200, so as to enhance light utilization rate. Furthermore, the reflective layer 700 can prevent light leak from occurring, so as to enhance display quality.

Figure 10:
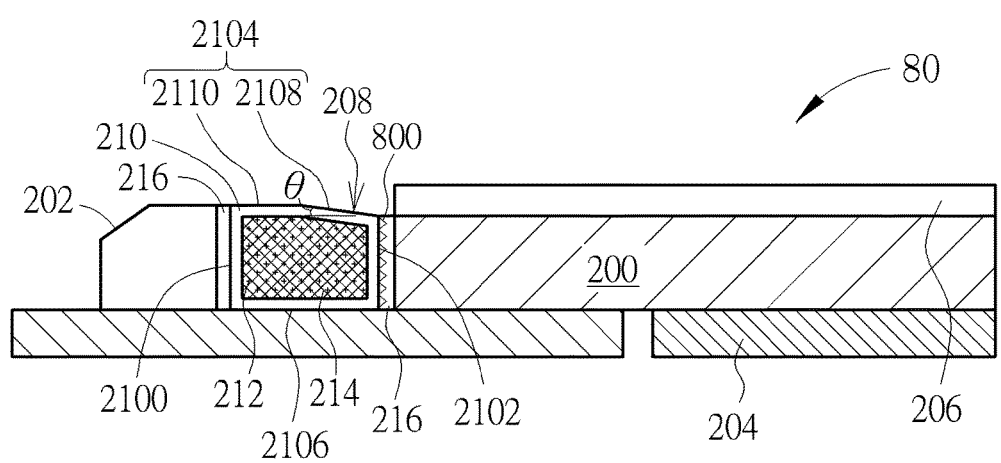
FIG. 10 is a schematic sectional view illustrating a backlight module according to a seventh embodiment of the invention.

Referring to FIG. 10, FIG. 10 is a schematic sectional view illustrating a backlight module 80 according to a seventh embodiment of the invention. The main difference between the backlight module 80 and the aforesaid backlight module 20 is that the quantum tube 208 of the backlight module 80 further comprises a diffusing structure 800 disposed on the light emitting surface 2102. In this embodiment, the diffusing structure 800 may be a saw-toothed structure or other convex-concave structures. Furthermore, the diffusing structure 800 may be formed with the tube body 210 integrally or may be attached on the light emitting surface 2102 of the tube body 210 by a UV curing process. The diffusing structure 800 can diffuse the light emitted by the light sources 202 before the light enters the light guide plate 200, so as to prevent light spot from occurring.

As mentioned in the above, the invention disposes the quantum tube with the inclined portion between the light guide plate and the light sources and disposes the first fluorescent particles and the second fluorescent particles in the quantum tube. Therefore, the light sources may emit identical first color light (e.g. blue light). Then, the first fluorescent particles convert the first color light (e.g. blue light) into a second color light (e.g. red light) and the second fluorescent particles convert the first color light (e.g. blue light) into a third color light (e.g. green light). Accordingly, the invention can ensure that the light emitting efficiency and lifespan of the light sources of the backlight module are uniform. Furthermore, since the first fluorescent particles and the second fluorescent particles are disposed in the quantum tube, they do not contact the light sources directly, such that the invention can prevent luminous decay from occurring on the first fluorescent particles and the second fluorescent particles due to high heat generated by the light sources. Moreover, in a thin type liquid crystal display device, the thickness of the light guide plate of the backlight module is usually thin. The inclined portion of the top surface of the quantum tube can guide the light emitted by the light sources to the light emitting surface effectively, so as to enhance light utilization rate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A quantum tube comprising:
   a tube body having a light incident surface, a light emitting surface, a top surface and a bottom surface, the top surface being connected between the light incident surface and the light emitting surface, the bottom surface being connected between the light incident surface and the light emitting surface, the top surface being opposite to the bottom surface, the top surface having an inclined portion and a horizontal portion, the inclined portion inclining with respect to the bottom surface by an angle, the horizontal portion being connected between the light incident surface and the inclined portion, the inclined portion being connected between the horizontal portion and the light emitting surface, the horizontal portion being parallel to the bottom surface;
   a plurality of first fluorescent particles disposed in the tube body; and
   a plurality of second fluorescent particles disposed in the tube body.

2. The quantum tube of claim 1, wherein the angle is between 2 degrees and 10 degrees.

3. The quantum tube of claim 1, wherein the inclined portion is a flat surface or an arc-shaped surface.

4. The quantum tube of claim 1, wherein the light incident surface is a flat surface and the light emitting surface is an arc-shaped surface.

5. The quantum tube of claim 1, wherein the tube body further has a plurality of first partitions, a plurality of second partitions and a plurality of third partitions arranged interlacedly without overlapping with each other, the first fluorescent particles are disposed in the first partitions, and the second fluorescent particles are disposed in the second partitions.

6. The quantum tube of claim 1, wherein the first fluorescent particles and the second fluorescent particles are mixed with each other.

7. The quantum tube of claim 1, further comprising a reflective layer disposed on the top surface.

8. The quantum tube of claim 1, further comprising a diffusing structure disposed on the light emitting surface.

9. A backlight module comprising:
   a light guide plate;
   a plurality of light sources; and
   a quantum tube disposed between the light guide plate and the light sources, the quantum tube comprising a tube body, a plurality of first fluorescent particles disposed in the tube body, and a plurality of second fluorescent particles disposed in the tube body, the tube body having a light incident surface, a light emitting surface, a top surface and a bottom surface, the top surface being connected between the light incident surface and the light emitting surface, the bottom surface being connected between the light incident surface and the light emitting surface, the top surface being opposite to the bottom surface, the top surface having an inclined portion and a horizontal portion, the inclined portion inclining with respect to the bottom surface by an angle, the horizontal portion being connected between the light incident surface and the inclined portion, the inclined portion being connected between the horizontal portion and the light emitting surface, the horizontal portion being parallel to the bottom surface, the light sources being adjacent to the light incident surface, the light guide plate being adjacent to the light emitting surface, the inclined portion inclining downwardly from the light sources towards the light guide plate.

10. A liquid crystal display device comprising:
    the backlight module of claim 9; and
    a liquid crystal display panel disposed on the backlight module.

11. The liquid crystal display device of claim 10, wherein the liquid crystal display panel is a blue phase liquid crystal display panel.

* * * * *